(12) United States Patent
Denning et al.

(10) Patent No.: US 6,997,430 B2
(45) Date of Patent: Feb. 14, 2006

(54) FAIL SAFE VALVE

(75) Inventors: Lars Denning, Odder (DK); Kenneth Michelsen, Aarhus C (DK); Joergen Seindal Wiwe, Solbjerg (DK)

(73) Assignee: Danfoss A/S, Nordborg (DK)

( * ) Notice: Subject to any disclaimer, the term of this patent is extended or adjusted under 35 U.S.C. 154(b) by 23 days.

(21) Appl. No.: 10/869,369

(22) Filed: Jun. 16, 2004

(65) Prior Publication Data

US 2004/0256586 A1    Dec. 23, 2004

(30) Foreign Application Priority Data

Jun. 20, 2003   (DE) .............................. 103 28 111

(51) Int. Cl.
*F16K 31/04* (2006.01)

(52) U.S. Cl. ...................... 251/71; 251/65; 251/129.11

(58) Field of Classification Search ............ 251/65–71, 251/129.11, 129.01
See application file for complete search history.

(56) References Cited

U.S. PATENT DOCUMENTS

| | | | |
|---|---|---|---|
| 3,842,601 A | 10/1974 | Borst | 60/326 |
| 4,090,589 A * | 5/1978 | Fitzwater | 251/71 |
| 4,296,912 A | 10/1981 | Ruyak | 251/65 |
| 4,501,981 A | 2/1985 | Hansen | 310/49 R |
| 4,671,486 A | 6/1987 | Giannini | 251/65 |
| 4,742,989 A | 5/1988 | Akagi | 251/129.05 |
| 4,757,684 A * | 7/1988 | Wright | 251/71 |
| 4,915,083 A | 4/1990 | Hewette et al. | 123/571 |
| 6,129,333 A * | 10/2000 | Ma | 251/71 |
| 6,769,665 B1 * | 8/2004 | Silva et al. | 251/71 |

* cited by examiner

*Primary Examiner*—John Bastianelli
(74) *Attorney, Agent, or Firm*—McCormick, Paulding & Huber LLP

(57) ABSTRACT

The invention concerns a fail-safe valve having a valve element, and a control motor being connected with the valve element via a driveline. It is endeavored to ensure the tightness of the refrigeration system in a simple manner. For this purpose, it is ensured that the valve element is located inside and the control motor outside a closed valve housing, that the drive line has a magnetic coupling, which acts through the housing, and that the valve element is pressure-released. In addition, a resetting device is provided that causes the valve element to be returned to a predetermined position upon the undesired cessation of control motor operation.

14 Claims, 4 Drawing Sheets

FAIL SAFE VALVE

CROSS-REFERENCE TO RELATED APPLICATIONS

This application is entitled to the benefit of and incorporates by reference essential subject matter disclosed in German Patent Application No. 103 28 111.8 filed on Jun. 20, 2003 and German Patent Application No. 10 2004 028 865.8 filed Jun. 15, 2004.

FIELD OF THE INVENTION

The invention generally concerns a fail-safe valve having a valve element, and a control motor connected with the valve element, and is more particularly directed to a mechanism by which the valve element is returned to a predetermined position upon drive failure.

BACKGROUND OF THE INVENTION

In large refrigeration systems, for example those used in the industrial field, correspondingly large valves are required; each of whose valve elements is activated from the outside by a control motor. When displacing the valve element, a passage through the valve is further released or further throttled. Such a valve can also be closed. In this case, the valve element bears on a valve seat.

In refrigeration systems, it is endeavoured to prevent the loss of refrigerant. When a system is filled with a combustible refrigerant, the loss of refrigerant can lead to dangerous situations. When ammonia is used as refrigerant, the escape of refrigerant will cause unpleasant smells. Large amounts of ammonia are also lethal. With refrigerants having a higher price, for example H-FCKW or H-FKW, refrigerant losses are expensive.

Weak spots with respect to sealing refrigeration systems are those places, in which a lead-through extending into a housing is required, for example to drive a valve element from the outside. Locating a control motor inside a refrigeration system is not always possible, as some refrigerants act aggressively upon electrical motors. Accordingly there is a need for a valve that can be driven without having to create a weak spot.

Another difficulty associated with valves of the above-described type occurs as a result of control motor failure. When this occurs, it is possible for the valve to remain in the position it was in when the motor failed. This may be a very undesirable position that could result in a loss of ability to properly control the refrigeration system. Accordingly, there is a need for an appropriate fail-safe mechanism to be associated with the valve.

Based on the foregoing, the general object of the present invention is to provide a fail-safe valve that improves upon or overcomes the problems and drawbacks of the prior art.

SUMMARY OF THE INVENTION

The present invention resides in one aspect in a valve having a valve element located inside and a control motor located outside a closed valve housing. A drive line is provided and includes a magnetic coupling, which acts through the housing. In addition, the valve element is pressure-released.

Through a combination of these three measures, the tightness of the valve can be ensured. The valve can be hermetically tight or sealed. The valve element is separated from the environment by the closed valve housing. The transfer of driving power takes place via the magnetic coupling. However, the amount of power, which can be transferred by means of a magnetic coupling, is limited. Accordingly, since a magnetic coupling is being employed the valve element must be movable using only a small amount of power. For this purpose, the valve element is pressure released, that is, measures are taken to ensure that substantially the same pressure is present on both sides of the valve element. These measures can, for example, be that a pressure-balancing channel is provided inside the housing or even inside the valve element, said channel acting upon both sides of the valve element with the same pressure. In this case, the valve element only has to overcome frictional forces. However, these frictional forces are small, as practically no external forces act upon the valve element. An advantage of the present invention is that due to the fact that the magnetic coupling does not need to transfer large forces, a relatively small and inexpensive control motor can be used.

Preferably, the control motor is a stepping motor. A stepping motor has the advantage that the position of the valve element can be determined by counting impulses supplied to the stepping motor. Additional sensors can also be used with the stepping motor.

Preferably, the magnetic coupling acts upon the valve element via a threaded connection. Thus, relatively accurate movement control of the valve element is achieved. At the same time, the movements of the valve element can be effected with extremely small forces. In operation, a first part of the threaded connection is turned that displaces another part of the threaded connection in an axial direction (in relation to the rotation of the first part of the threaded connection). Depending on the pitch of the thread defined by the threaded connection, very small movements are achieved per angular increment of the control motor. These movements can, for example, be about 5/100 mm per 2° of rotation.

Preferably, the valve element is non-rotatably retained, and the threaded connection includes a spindle screwed into the valve element or into a part connected with the valve element. This embodiment has the advantage that the valve element is only moved axially, that is, in the direction of the valve seat or away from the valve seat. These closing or opening movements, respectively, will not turn the valve element in relation to the valve seat.

Preferably, an adapter piece surrounds an outlet-side part of the magnetic coupling. This adapter piece can then be sized with a view to the fact that a transfer of magnetic forces through the adapter piece is possible. The adapter piece must also be able to withstand the pressures occurring in the refrigeration system or in the area of the valve. For example, the adapter piece can be made of a different material than the rest of the valve housing.

It is also preferable that the adapter piece is made of a magnetically non-conducting material. The adapter piece, which can, for example, be made of austenitic steel, then does not interfere with the power transfer between the two parts of the magnetic coupling.

Preferably, the adapter piece is threadably connected to the valve housing. This ensures a connection between the adapter piece and the valve housing, which is stable enough to withstand the pressures present in the valve. These pressures can reach 50 bar.

Preferably, the control motor is mounted on the adapter piece. This provides a simple way of ensuring a relatively accurate positioning of the control motor as well as the parts of the magnetic coupling connected with the control motor and the parts of the magnetic coupling connected with the valve element. The control motor is detachable from the valve. A defective control motor can easily be replaced. In an emergency situation, a hand wheel can be used instead of the control motor, to displace the valve during a failure of the control motor.

Preferably, the control motor has a pipe-shaped extension, which surrounds a drive-side part of the magnetic coupling. Together with its pipe-shaped extension, the control motor protects the magnetic coupling. This protection has several advantages. First, the extension removes the possibility of outside interference, which could lead to unintentional displacement of the valve element. Second, the pipe-shaped extension provides a simple way of positioning the control motor on the adapter piece and thus on the housing.

It is particularly preferred that a rotor is located axially relative to the extension. The rotor can then be located coaxially with the spindle and the valve element.

Preferably, the magnetic coupling has radially directed magnets. This has the advantage that when sizing the magnets, the diameter of the magnetic coupling causes no restrictions. Thus, relatively long overlapping areas between the magnets on the outlet-side part of the magnetic coupling and those on the drive-side part of the magnetic coupling can be achieved. Preferably, the magnets can be rare earth magnets or neodymium magnets. Such magnets have sufficient power to transfer the drive power of the control motor to the valve element via the magnetic coupling.

In an alternative or additional embodiment, the magnetic coupling can have axially directed magnets. When only relatively weak forces have to be transferred, axially directed magnets will be sufficient, that is, the magnet front sides are facing each other. When using the axially directed magnets additionally to the radially directed magnets, even larger transfer performances can be achieved.

Preferably, the valve has a resetting or fail-safe device. The resetting device resets the valve element to a predetermined position, when the drive from the control motor fails. Such a situation can, for example, occur during current failure. In this case, it can, for example, be important that the valve closes. The resetting device then ensures that the valve element is brought to bear on the valve seat. In other cases, it may be important that, during failure of the driving power, the valve opens completely. In this case, the resetting device ensures that the valve element is taken to its end position, in which the valve has its largest opening.

BRIEF DESCRIPTION OF THE DRAWINGS

In the following, the invention is described on the basis of preferred embodiments in connection with the drawings, showing.

DETAILED DESCRIPTION OF THE PREFERRED EMBODIMENTS

Figure 1:
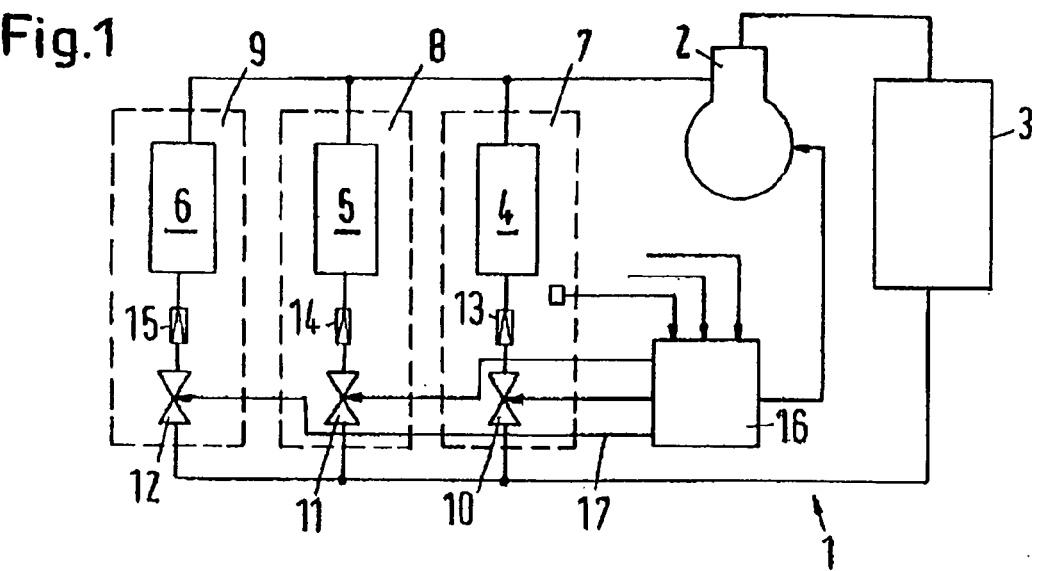
FIG. 1 schematically illustrates a refrigeration system.

FIG. 1 schematically shows a refrigeration system 1 with a compressor 2, which supplies a refrigerant under high pressure and at a high temperature to a condenser 3. In the condenser 3 the refrigerant is cooled. Due to this cooling, the refrigerant converts to a fluid. The condenser 3 supplies three connected evaporators 4, 5 and 6, connected in parallel, each located in a cold room 7, 8 or 9, respectively. The connection between the condenser 3 and each evaporator 4, 5 and 6 takes place via a valve 10, 11 and 12 and a throttling member 13, 14 and 15. The throttling member can, for example, be a capillary tube or an expansion valve. For reasons of clarity, the valves 10, 11, and 12 are shown separately from the throttling members 13, 14 and 15. Usually, each valve 10, 11, and 12 is combined with the related throttling member 13, 14, and 15.

A control device 16 controls the valves 10, 11, and 12 and the compressor 2.

Figure 2:
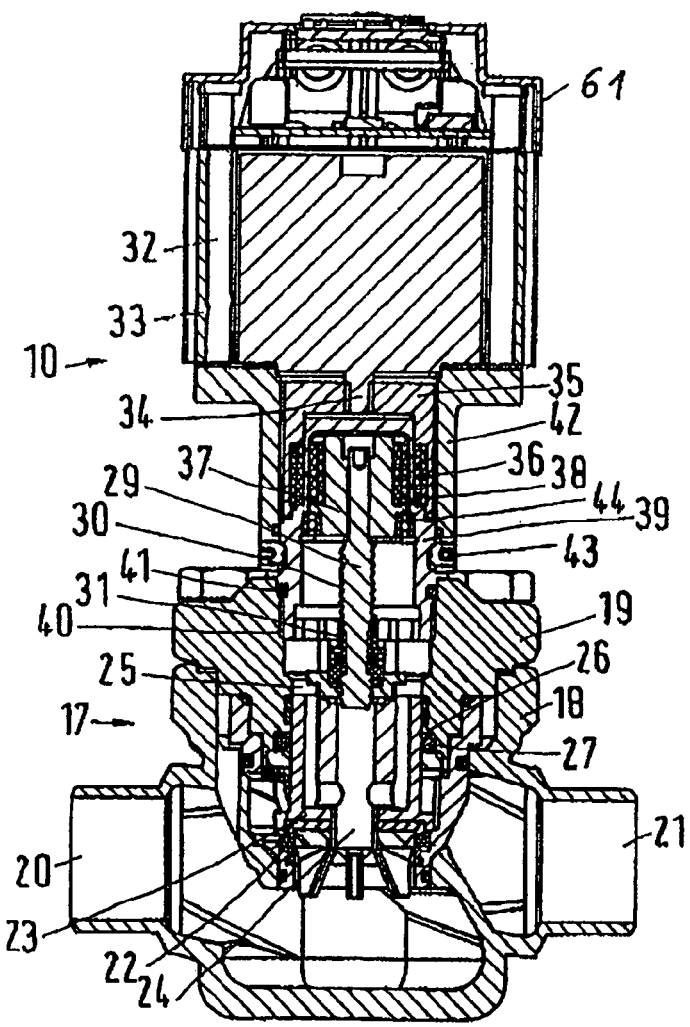
FIG. 2 is a cross-sectional view of a valve.

An example of a valve 10 is shown in FIG. 2. Such a valve 10 can, of course, also be located in other positions in the refrigeration system. In principle, the valve 10 shown in FIG. 2 can be used everywhere where refrigerant must be controlled. The valve 10 has a valve housing 17 with a bottom part 18 and a top part 19. An inlet 20 and an outlet 21 are located in the bottom part 18. Between the inlet and the outlet is located a valve seat 22, which interacts with a valve element 23. In the position shown in FIG. 2, the valve 10 is closed, that is, the valve element 23 bears on the valve seat 22.

The valve element 23 has a pressure release channel 24, which is connected with the inlet 20 and ends in a pressure chamber 25, which is located on the side of the valve element 23 facing away from the valve seat 22 generally opposite an inlet end thereof. The pressure in the pressure chamber 25 acts upon the valve element 23 via an area, which has practically the same size as the area, via which the pressure from the inlet 20 acts upon the valve element 23. The valve element 23 is thus pressure released, that is, the forces acting upon the valve element 23, loading it in the direction towards the valve seat 22 or away from it, are substantially equalised. While a pressure release channel connected with the inlet has been described, the present invention is not limited in this regard as the pressure release cannel can also be connected with the outlet 21 without departing from the broader aspects of the present invention.

The valve element 23 is supported in a guide 26 to be axially displaceable, that is, away from the valve seat 22 or towards it. A sealing 27 is provided between the valve element 23 and the guide 26. A distortion protection, not shown in detail in FIG. 2, ensures that the valve element can only be axially displaced, however, not turned.

For displacing the valve element 23, a spindle 29 is provided, which has an outer thread 30. The outer thread 30 threadably engages a displacement member shown in the illustrated embodiment as a nut 31 with a corresponding inner thread, which is connected with the valve element 23. When the spindle 29 is turned, the threaded connection formed by the outer thread 30 and the nut 31 converts the rotational movement of the spindle 29 to a translational movement of the valve element 23.

The rotation drive of the spindle 29 occurs via a stepping motor 32, which is controlled by the control device 16. The stepping motor 32 in a housing 33 has a rotor, whose output shaft 34 is non-rotatably connected with an outer magnet holder 35. In the outer magnet holder 35, several permanent magnets 36 are distributed in the circumferential direction. The permanent magnets 36 are, for example, Neodymium magnets.

The spindle 29 is non-rotatably connected with an inner magnet holder 37, which carries several permanent magnets 38 on its outer circumference. Preferably, the number of permanent magnets 38 on the inner magnet holder 37 corresponds the number of permanent magnets 26 of the outer magnet holder 35. The permanent magnets 36, 38 are magnetised so that they attract each other mutually. Thus, when the outer magnet holder 35 is turned, the inner magnet holder 37 turns too, as the permanent magnets 36 on the outer magnet holder 35 take along the permanent magnets 38 on the inner magnet holder 37.

An adapter piece 39 is located between the outer magnet holder 35 and the inner magnet holder 37. The adapter piece 39 is made of a magnetically non-conducting material, for example austenitic steel. The adapter piece 39 is screwed into the top part 19 of the housing 17 by means of a thread 40. A sealing 41 is provided for sealing the complete housing 17, that is, also the adapter piece 39. The sealing is sized so that it can stand a pressure difference of at least 50 bar.

The adapter piece 39 is cup-shaped. Between the magnets 36, 38 it has a relatively small wall thickness.

The stepping motor 32 has a pipe-shaped extension 42, which is pushed onto the adapter piece 39. The extension 42 is made of a magnetically non-conducting material. Via the extension 42, the stepping motor 42 is fixed on the housing 17, for example by means of two headless screws 43, which engage in corresponding recesses on the outside of the adapter piece 39.

The inner magnet holder 37 is supported on the adapter piece 39 via ball bearings 44. The outer magnet holder 35 is fixed on the motor 32.

The valve 10 can now be controlled in a relatively sensitive manner. The rotor 33 of the stepping motor is rotated over a predetermined angular area. The resolution per impulse sent to the stepping motor 32 can, for example, be in the magnitude of 2°. Via the magnetic coupling through the magnets 36, 38, the spindle 29 is accordingly rotated. Through the transmission formed by the threaded connection 30, 31, the valve element 23 is then moved by a predetermined distance away from or in the direction of the valve seat 22, between an open and a closed position, for each angular increment of the rotor 33. By counting the impulses, which are supplied to the stepping motor 32, the position of the valve element 23 in relation to the valve seat 22 can be determined relatively accurately.

Of course, other motors than stepping motors can be used. In this case, sensors are recommended, which establish the position of the valve element 23 in relation to the valve seat 22.

On the side facing away from the valve element 23, the motor 32 has a resetting device, which will be explained on the basis of FIG. 3. The resetting device cannot be seen in FIG. 2. The resetting device ensures that during current failure or another error resulting in the undesired cessation of motor operation, the valve 10 can be brought to a certain predetermined state. This state could, for example be that the valve 10 is completely closed. However, it could also be that the valve is completely opened.

For this purpose, the output shaft 34 of the motor 32 is extended upwards, forming a shaft end 46. On the shaft end 46 a plate 62 is non-rotatably fixed, that is, the plate 62 rotates with the output shaft of the motor and thus with the spindle 29, which drives the valve element 23.

A torsion-type suspension 63 is inserted in the plate 62, that is, with one end fixed non-rotatably with the plate 62. The other end of the torsion-type suspension 63 is connected with a housing 64 of the resetting device module 65. Thus, when the shaft end 46 and the plate 62 are turned, the torsion-type suspension 63 is tensed.

In this case, the outer thread 30 of the spindle 29 has a relatively large pitch of, for example, 5 to 15 mm per rotation. When, for example, the outer thread 30 has a pitch of 10 mm per rotation, and the maximum opening width, that is the maximum distance between the valve seat 22 and the valve element 23 is also 10 mm, one single rotation of the control motor 32 will be sufficient to either open or close the valve completely. Accordingly, the torsion-type suspension 63 can do with a force, which reverts the motor 32 by one rotation, when the valve has to be closed in connection with a current failure.

Figure 3:
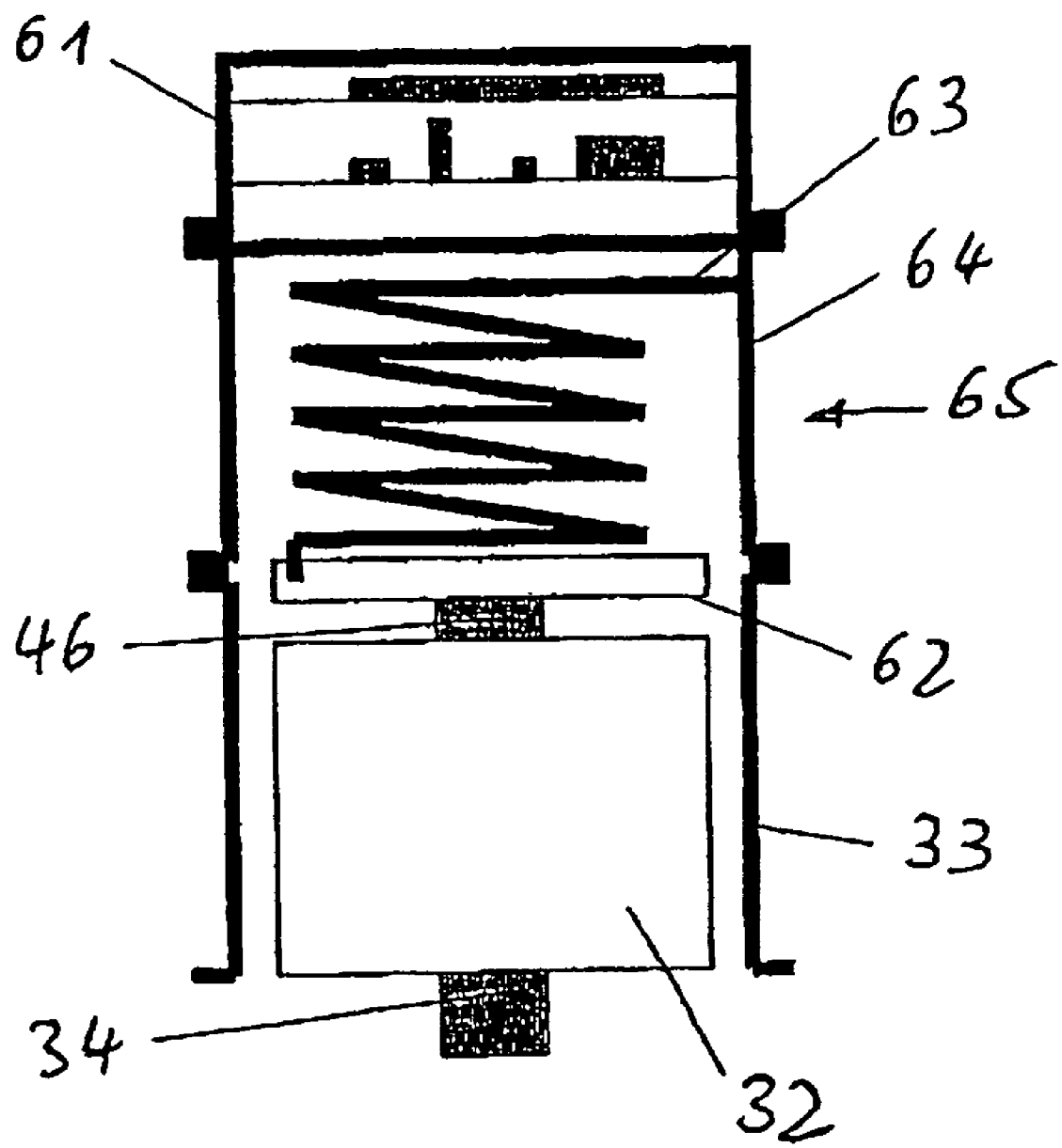
FIG. 3 schematically illustrates one embodiment of a fail-safe device.

The resetting device shown in FIG. 3 is formed as a module 65, which is located on the side of the motor 32 facing away from the housing 17, for example between the motor 32 and a housing 61 (FIG. 2) containing control electronics for the motor 32. The module embodiment has the advantage that it requires no large changes to make the valve with or without resetting device.

Figure 4:
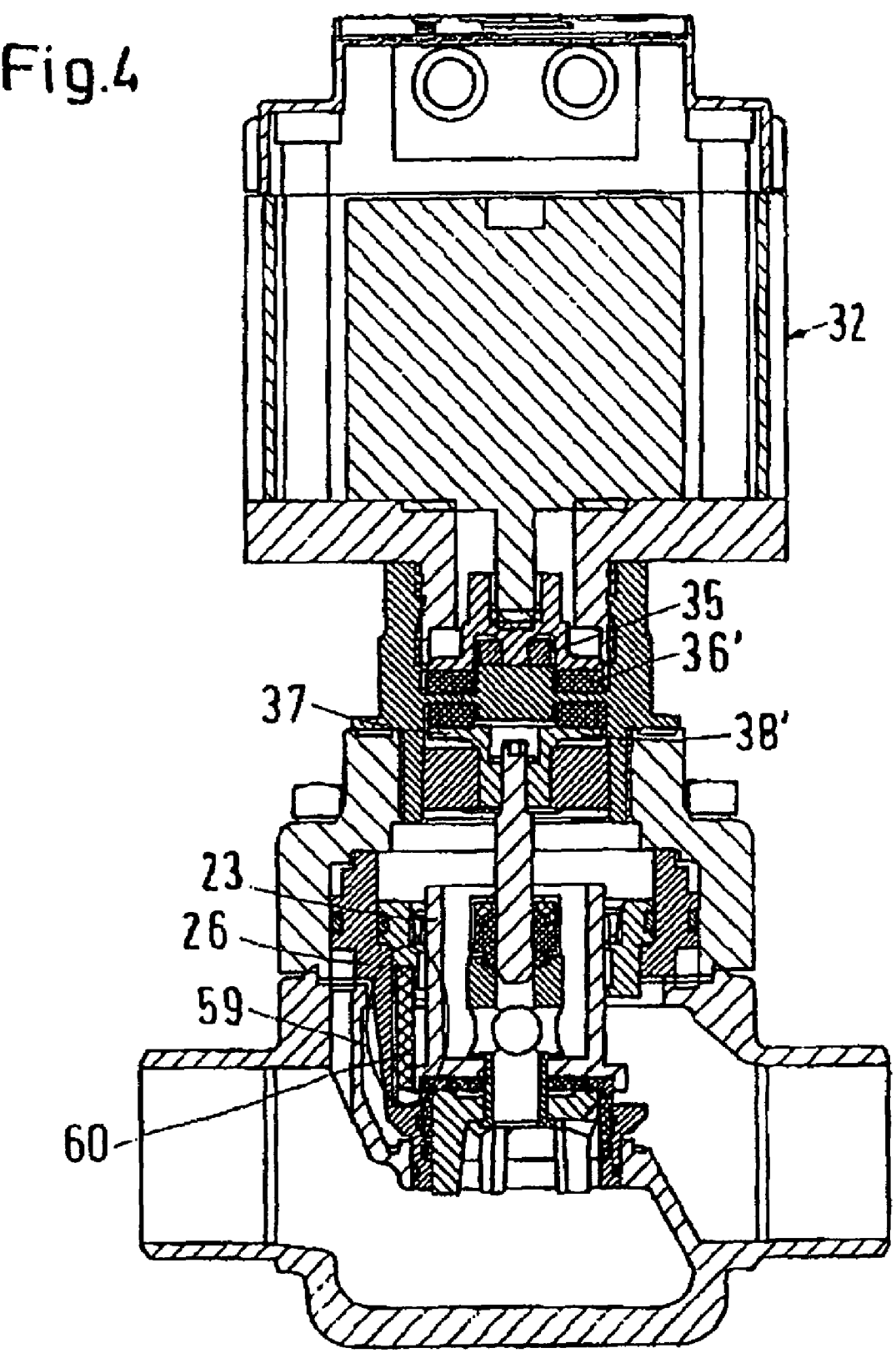
FIG. 4 is a further embodiment of a valve.

FIG. 4 shows another embodiment, in which the same parts have the same reference numbers. The most substantial change is that the permanent magnets 36, 38, which are fixed on the outer or the inner magnet holder 35, 37, respectively, are no longer directed in the radial direction, but in the axial direction. This saves accessories. On the other hand, however, the forces transmitted by the magnets 36, 38 are also smaller.

A rotation protection 59, with which a rotation movement of the valve element 23 shall be prevented, has, in this case, a spring, which engages in a groove in the guide 26 on the one side and at the valve element 23 on the other side.

Figure 5:
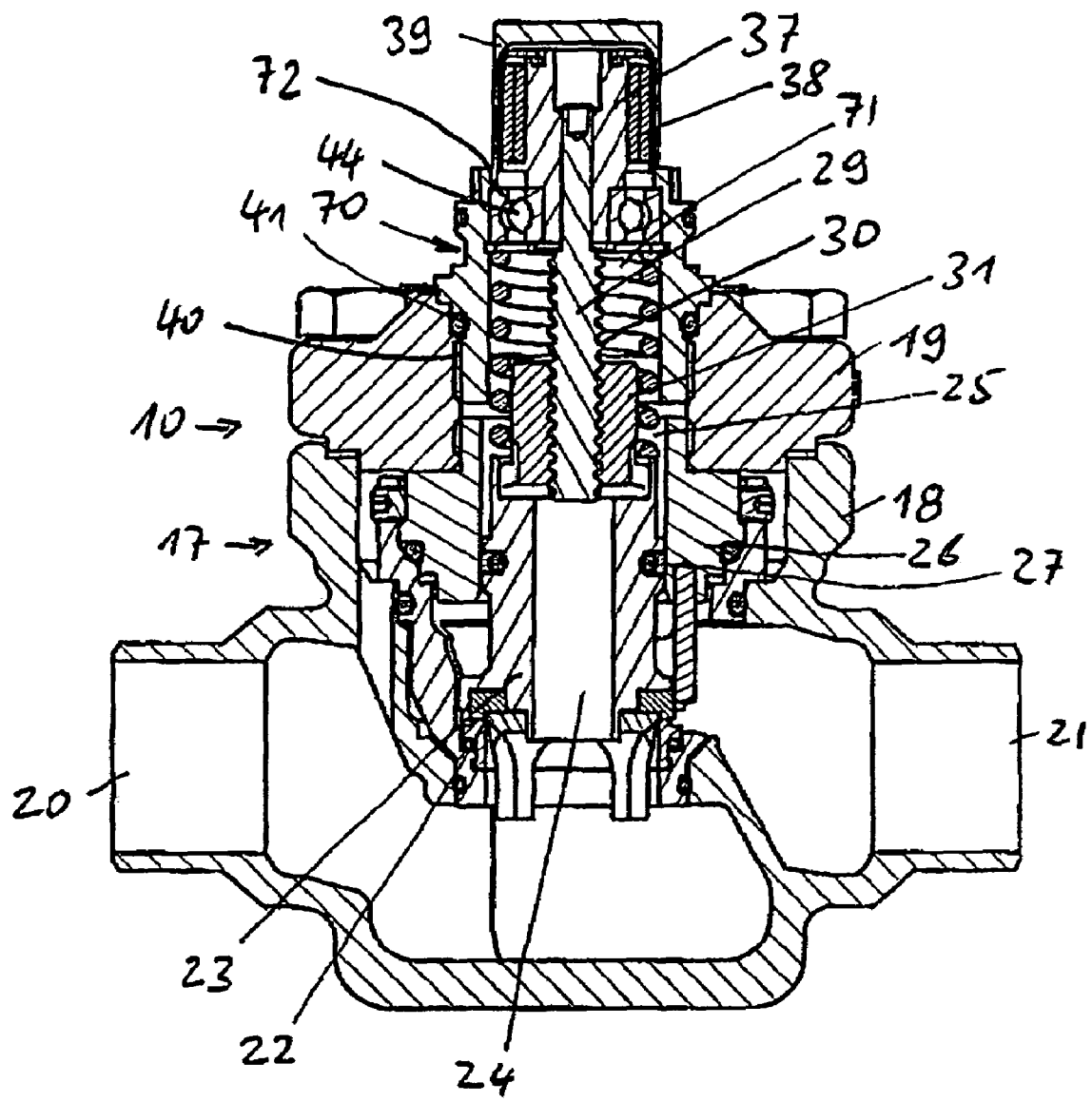
FIG. 5 is a cross-sectional view of another embodiment of a resetting or fail-safe device.

FIG. 5 shows a further embodiment of a valve 20, in which same and functionally same elements have the same reference numbers as in FIG. 2. Contrary to the embodiment according to FIGS. 2 and 3, here a resetting device 70 is provided inside the housing 17. The resetting device 70 has a pressure spring 71, shown as a coil spring in the illustrated embodiment, which is supported between the valve element 23 and a spring washer, which retains an outer ring 72 of the ball bearing 44. The pressure spring 71 presses the valve element 23 in the direction of the valve seat 22.

The nut is made of a plastic, which interacts under little friction with the material of the spindle 29. This plastic can, for example, be a polyaryl ether ketone, polyether ether ketone (PEEK), or polyoxymethylene (POM). In connection with a corresponding diameter of the spindle 29 and a corresponding pitch of the thread 30, which, for example, causes a movement of approximately 10 mm per rotation of the spindle 29, it is ensured that the threaded connection between the spindle 29 and the nut 31 is not made to be self-locking, so that a pressure from the pressure spring 71 will not only displace the valve element 23, but also turn the spindle 29.

This is made possible by the fact that the valve element 23 is pressure-released by means of the pressure release channel 24. Thus, only relatively small external forces act upon the valve element 22, so that the pressure spring 71 does not have to provide excessively large forces.

The pressure spring 71 is located inside the valve housing 17 on the side of the valve element 23 facing the motor, so that the motor can be replaced, when it indicates an error or needs maintenance. In this case, the valve 10 is closed. Of course, it depends on the resetting device 70. When this is made differently, it can also ensure that the valve 10 is opened, when no other forces are available.

The pressure spring 71 generates forces, which are sufficient to overcome a catch force of the control motor 32, which it possesses in the unpowered state. That is, the resetting device 70 can also bring the valve element 23 to rest on the valve seat 22, when the motor 32 is still fitted on the housing 17.

In FIG. 5 the motor 32 is not mounted to make it clear that the resetting device 70 in FIG. 5 can also work, when the motor has a different embodiment.

While preferred embodiments have been shown and described, various modifications and substitutions may be made without departing from the scope of the present invention. Accordingly, it is understood that the present invention has been described by way of example, and not by limitation.

What is claimed is:

1. A fail-safe valve comprising:
   a valve housing having an inlet and an outlet;
   a valve element operably positioned in said valve housing for movement between an open position wherein said inlet is in fluid communication with said outlet and a closed position wherein said valve element engages a valve seat;
   equalizing means for minimizing pressure differential between an end of said valve element engageable with said valve seat and a generally opposite end of said valve element, in response to fluid pressure exerted against said valve element;
   a displacement member coupled to said valve element;
   a spindle, at least a portion of which is rotatably positioned in said valve housing, said spindle being threadably engaged at one end with said displacement member and having at least one first magnet coupled to an opposite end of said spindle;
   a drive including a rotatable drive shaft having at least one second magnet coupled thereto, said at least one first magnet and said at least one second magnet cooperating to define a magnetic coupling, such that during operation, rotation of said drive is transferred to said spindle via said magnetic coupling whereby said spindle and said displacement member threadedly cooperate to move said valve element between said open and said closed positions; and
   biasing means for urging said valve element toward one of said open and closed positions, thereby causing said spindle to rotate relative to said displacement member and move said valve element to a predetermined position in response to an undesired cessation of operation of said drive.

2. A fail-safe valve as defined by claim 1 wherein said biasing means is a coil spring positioned in said valve housing and surrounding at least a portion of said spindle, said coil spring having one end engaged with said valve element and being one of compressible or tensionable as said valve element moves toward one of said open position and said closed position, so that upon undesired cessation of drive operation said spring exerts force on said valve element and thereby said displacement member to cause said spindle to rotate relative to said displacement member thereby allowing said valve member to move toward said predetermined position.

3. A fail-safe valve as defined by claim 2 wherein said displacement member is polymeric and defines a threaded bore extending there through.

4. A fail-safe valve as defined by claim 3 wherein said displacement member is a nut.

5. A fail-safe valve as defined by claim 1 further comprising an inner magnet holder attached to said spindle, and wherein said at least one first magnet is coupled to said inner magnet holder.

6. A fail-safe valve as defined by claim 5 further comprising an adapter piece coupled to said housing, said inner magnet holder extending into, and being rotatably supported by said adapter piece.

7. A fail-safe valve as defined by claim 6 wherein at least the portion of said adapter piece surrounding said at least one first magnet is made of a non-magnetic material.

8. A fail-safe valve as defined by claim 7 wherein said at least one second magnet is coupled to an outer magnet holder mounted on said drive shaft, said outer magnet holder being located relative to said adapter piece so that said at least one first magnet, and said at least one second magnet are substantially aligned with one another to form said magnetic coupling, and wherein said outer magnet holder is rotatable relative to said adapter piece.

9. A fail-safe valve as defined by claim 8 further comprising an extension coupled to said valve housing, said outer magnet holder and said portion of said adapter piece surrounding said at least one first magnet being positioned in said extension, said outer magnet holder being rotatable relative to said extension, at least a portion of said extension surrounding said outer magnet holder is formed from non-magnetic material, and wherein said drive is mounted on said extension.

10. A fail-safe valve as defined by claim 9 wherein said drive is a stepping motor.

11. A fail-safe valve as defined by claim 1 wherein said equalizing means includes a pressure chamber in fluid communication with said generally opposite end of said valve member, and means for transferring pressure between said pressure chamber and said end of said valve member engageable with said valve seat to thereby minimize pressure differential between opposing ends of said valve member.

12. A fail-safe valve as defined by claim 8 wherein said at least one first magnet includes a plurality of first magnets radially disposed about said inner magnet holder, and said at least one second magnet includes a plurality of second magnets radially disposed about said outer magnet holder.

13. A fail-safe valve as defined by claim 1 wherein said drive is a motor and said biasing means includes a torsion spring coupled to said drive shaft such that rotation thereof causes said valve element, via said magnetic coupling, to move toward a respective one of said open and said closed positions, and also causes a torque to be generated in said torsion spring that, upon undesired cessation of operation of said motor causes said drive shaft and thereby said spindle to rotate and move said valve element to said predetermined position.

14. A fail-safe valve as defined by claim 3 wherein said spindle is formed from stainless steel.

* * * * *